UNITED STATES PATENT OFFICE.

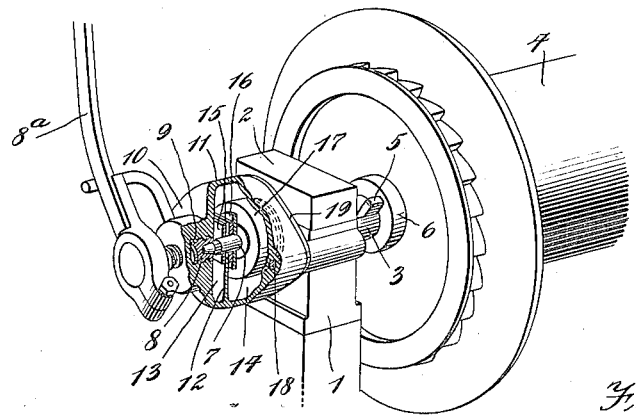
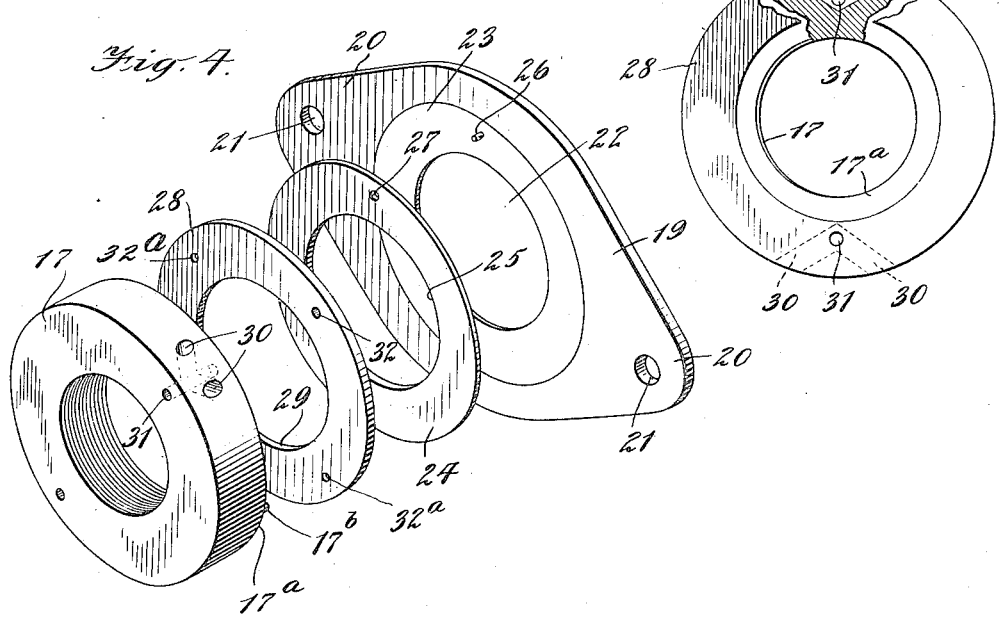

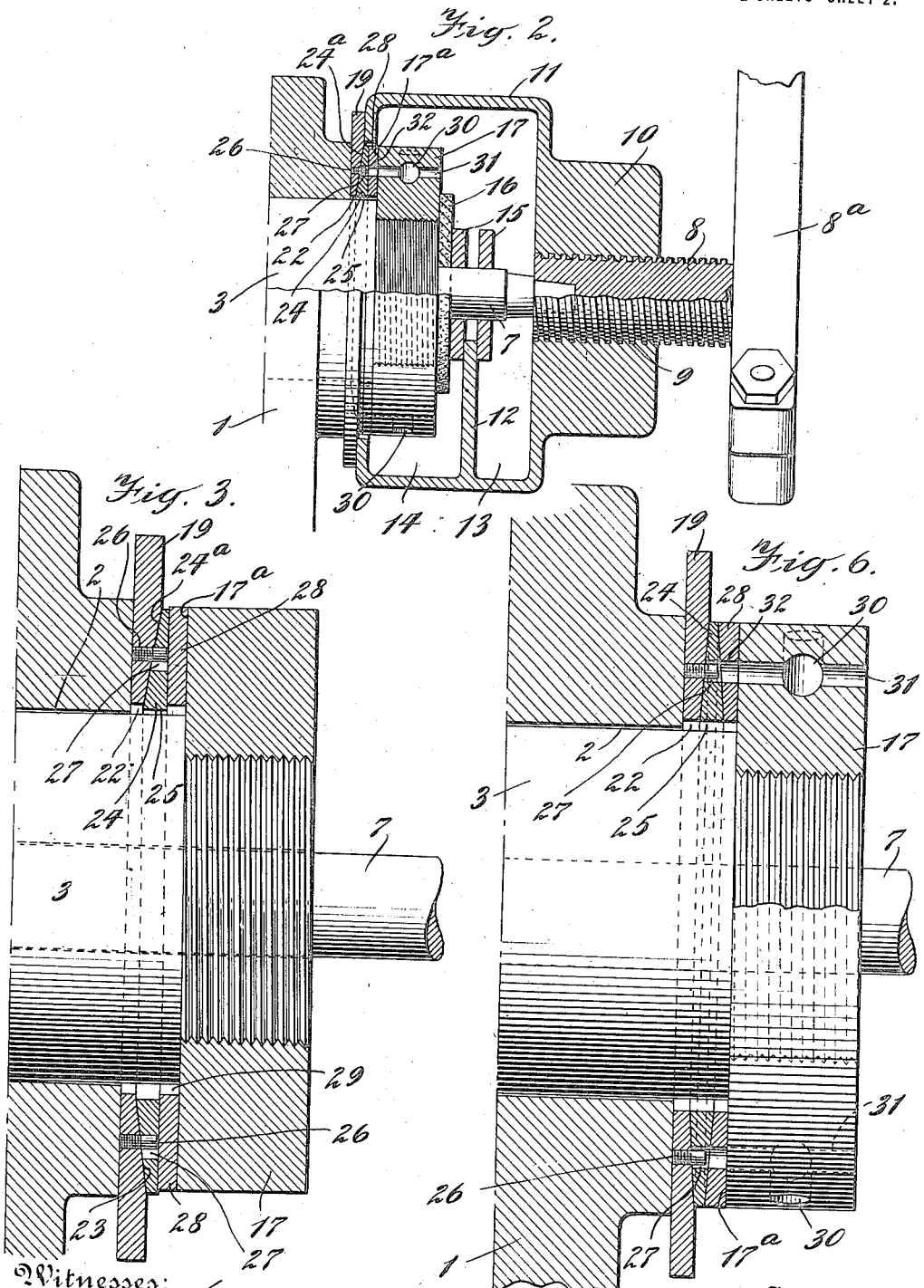

ALBERT J. ELDRIDGE, OF BUFFALO, NEW YORK, ASSIGNOR TO LIDGERWOOD MANUFACTURING COMPANY, OF NEW YORK, N. Y., A CORPORATION OF NEW YORK.

THRUST MECHANISM.

1,165,655.

Specification of Letters Patent.

Patented Dec. 28, 1915.

Application filed April 16, 1913. Serial No. 761,409.

*To all whom it may concern:*

Be it known that I, ALBERT J. ELDRIDGE, a citizen of the United States, residing at Buffalo, in the county of Erie and State of New York, have invented certain new and useful Improvements in Thrust Mechanisms, of which the following is a specification.

My invention relates to new and useful improvements in thrust mechanisms for applying and relieving the frictional contact between a driving element and a driven element, and more particularly thrust mechanisms of the type employed in connection with drums of rope engines for connecting the drum with, and disconnecting it from, its driving member.

In one type of thrust mechanism of which I am aware, a drum is mounted on a drum shaft to slide longitudinally thereof toward and away from a driving gear, either keyed to the shaft or loosely mounted thereon, the end of the shaft opposite to that carrying the gear being journaled in a pedestal bearing and carrying on its outer end a thrust collar to engage the face of the pedestal to limit end thrust of the shaft. In such a structure, it sometimes occurs that, owing to heavy strains on the drum shaft, the latter is deflected so that the thrust collar described bears unevenly against the face of the bearing or pedestal, cutting into the same as well as becoming itself worn and causing undue heating between the bearing and the thrust collar.

The objects of the invention are to provide a simple and effective means for obviating the objections just set forth, and said objects are accomplished by a compensating means arranged between the bearing and the thrust collar, which means will at all times present a bearing surface in a plane parallel to the plane of the bearing face of the thrust collar without regard to deflection of the drum shaft, so that there is always a uniform pressure between the collar and the part against which its thrust is exerted.

The invention consists in the construction and combination of parts to be fully described hereinafter, and the novelty of which will be particularly pointed out and distinctly claimed.

I have fully and clearly illustrated my invention in the accompanying drawings to be taken as a part of this specification and wherein:

Figure 1 is a perspective view partly in section of a friction thrust mechanism having my invention applied thereto. Fig. 2 is a central longitudinal section through a thrust embodying my invention. Fig. 3 is an enlarged central longitudinal detail section of part of the structure shown in Fig. 2. Fig. 4 is a disassembled perspective of parts of the invention. Fig. 5 is a detail view, partly in section, of the improved form of thrust collar. Fig. 6 is a central longitudinal section of another embodiment of the same invention.

Referring to the drawings by characters of reference: 1 designates a pedestal carrying a bearing 2 in which is journaled a drum-shaft 3, upon which is mounted a drum 4, said drum being movable lengthwise of the shaft to clutch it to its driving element or gear (not shown) located at the opposite end of the shaft from the bearing 2. Extending through a transverse slot in the shaft 3 is a cross-key or pin 5 having engagement with a collar 6 on the adjacent head of the drum, said cross-key being movable lengthwise of the shaft by means of a thrust pin 7 slidable lengthwise of the shaft in a central bore therein. The outer end of the pin 7 projects beyond the end of the drum shaft and is socketed, as shown, in the end of a thrust screw 8 threaded at 9 in the end wall 10 of the oil-box 11, said screw 8 carrying an operative lever 8ª by means of which it is turned to thrust the pin 7 and key 5 lengthwise of the shaft to move the drum into engagement with its driving member, or to relieve the pressure on the drum to free it from the driving member. The oil-box is divided by a partition 12 into compartments 13, 14, to contain oil or other lubricant, the point of contact between the pin 7 and the thrust screw 8 being in the compartment 13, in which the oil is maintained at a level to always cover the said point of contact. Leather washers 15 and a felt washer 16 mounted on the pin 7, act as a dam to confine the oil in the compartment 13, the felt washer 16 contacting the head of the shaft, and the thrust collar 17 which is threaded on the end of the drum shaft. The collar 17 has a bearing or contact face 17ª at right angles to the shaft's axis, and facing the bearing, and adapted to engage parts to be presently described. The oil-box 11 is secured to the bearing pedestal 1 by bolts 18, one of which is shown in section in Fig. 1, it being understood that there are two of these bolts, one on each side of the box.

Above I have described briefly the known type of thrust mechanism, previously mentioned, and which in itself does not constitute my present invention, except in so far as it, or parts thereof, may enter into combination with the improvements I will now describe.

Secured against the face of the bearing pedestal 1 between the inner side face of the thrust collar, and said pedestal or bearing, is a member 19 consisting of a plate having side ears 20, 20, having apertures 21, 21, to receive the bolts 18 for securing the oil-box in place, whereby said plate is firmly and rigidly clamped in place between the box and the bearing when the bolts are tightened to secure the said box in position. This plate is formed with a central opening 22 through which the drum shaft 3 extends, said opening being of a diameter greater than the diameter of the shaft, and the openings 21 being of greater diameter than the bolts 18, so as to permit adjustment of the plate 19, in any direction for a limited distance about the shaft. About the central opening 22 the plate 19 is dished out as at 23 to form an annular arcuate concave bowl or socket, the same being made on a curve of large radius, say 24 inches. The member 19 is preferably made of sheet steel, such as boiler plate.

Seated in the concave bowl or socket 23 and surrounding the shaft is an annular compensating member, preferably in the form of a ring 24 having a convex face 24ª seated in said socket and formed on an arc coincident with the socket so that said compensating member or ring may move transversely of the socket member in all directions. The diameter of the opening 25 through the compensating member is greater than the diameter of the shaft 3, whereby it may move transversely of the shaft without coming in contact therewith, the movement of said compensating member being limited by stop pins 26 screwed into the member 19 and projecting into openings 27 in the compensating ring, so that during its movements said member 24 will not come in contact with the shaft 3. These openings 27 are of greater diameter than that of the pins 26 so as to permit a limited movement of the compensating ring radially of the shaft. This member 25 is preferably, although not necessarily, of bronze.

Arranged between the compensating member 24 and the thrust collar 17 is a steel washer 28 having an opening 29, through which the shaft 3 extends, of a diameter greater than that of the said shaft. The screw collar 17 is provided with passages 30 opening at their outer ends through the periphery thereof and converging at their inner ends into communication with a passage or duct 31 extending through the collar parallel to the axis of rotation thereof, and longitudinal of the shaft. These ducts 30 serve to catch the lubricant contained in the oil-box and convey it to the passage or duct 31, from which it is distributed between the adjacent faces of the collar 17 and the washer 28 and passed through openings 32 in the said washer 28 to serve to lubricate the adjacent faces of the washer 28 and the compensating member 24. The lubricant can also pass through the openings 27 and be distributed between the contacting faces of the member 24 and the socket plate or member 19. The friction collar 17 is provided with pins 17ᵇ which project into the openings 32ª of the steel washer 28 so that said washer turns with the collar. During the rotation of the drum shaft 3 the collar 17 and washer 28 turn with the shaft, but the members 19 and 24 do not rotate. Should the shaft be deflected for any reason, as excessive strain on the drum, the thrust collar will act through the washer 28 to rock the member 24 in the socket 23, so that the members 19 and 24 constitute in effect a universal ball-and-socket equalizer or compensator, with the result that whenever the shaft 3 is deflected the member 24 will be rocked in its socket so that the face of said member 24 toward the washer 28 will always be parallel to said washer and to the face of the thrust collar. By this arrangement the thrust collar is always held out of contact with the face of the bearing, and the thrust of the thrust collar toward the bearing is always against a surface which is parallel to the inner face of the thrust collar. Also by this provision the edges of the thrust collar are prevented from grinding against or cutting into any surface or becoming unduly heated, and there is a uniform pressure between the whole area of the inner face of the collar 17 and the adjacent bearing face, i. e., the washer 28.

In Fig. 6 I have shown another embodiment of the same invention in which both faces of the member 24 are convex, being formed on an arc, and the washer 28 is formed with a concave arcuate seat to receive the outer face of said member 24 opposite to the socket member 19. In this arrangement, as in the preferred form, any deflection of the shaft will, through the thrust exerted by the collar on the washers, serve to cause them to adjust themselves to present a bearing surface always parallel to the inner face of the thrust member.

What I claim and desire to secure by Letters Patent of the United States is:—

1. In combination, a bearing, a shaft journaled therein, a thrust collar on the shaft, an annular concave seat surrounding the shaft, an annular plate surrounding the shaft and having opposite convex faces one of which is seated in said seat, a concave washer arranged between said plate and the thrust collar and engaging the other convex face of the plate.

2. In combination, a bearing, a shaft journaled therein, a thrust collar on the shaft, an oil box surrounding the thrust collar, a concave seat adjacent the bearing and surrounding the shaft, an annular convex member surrounding the shaft and seated in said seat, said convex member having a lubricant duct opening between said members, a bearing washer between the collar and said convex member and having a lubricant duct opening between the said member and washer, and a passage in the collar to receive lubricant from the box and opening between the collar and said washer.

3. The combination of a bearing, a shaft journaled in the bearing, a thrust collar on the shaft, a bearing ring fixed to said collar, and means capable of permitting a limited lateral movement of the end of said shaft comprising a stationary member and a compensating member, one of said members having a convex surface and the other having a concave surface, said surfaces being disposed in contact with each other.

4. The combination of a bearing, a shaft journaled in and having its end projecting beyond the bearing, a thrust collar fixed on the shaft near the end thereof, a bearing ring movable with said collar and located between the collar and bearing, means capable of permitting a limited lateral movement of the end of said shaft and comprising a stationary member and a compensating member, one of said members having a convex surface and the other having a concave surface, said surfaces being disposed in contact with each other, a housing inclosing the end of said shaft, the collar, the ring and said members, and means for securing said housing and said stationary member in place.

5. In combination, a pedestal provided with a bearing, a horizontal shaft journaled at one end in said bearing, a thrust collar on said shaft, an annular concave socket member fixed to the outer side of said pedestal and surrounding said shaft, a compensating member surrounding the shaft and having an annular convex portion seated in the socket member, and means on the socket member to hold said compensating member against rotation.

6. In combination, a pedestal provided with a bearing, a horizontal shaft journaled at one end in said bearing, a thrust collar on said shaft, an annular concave socket member fixed to the outer side of said pedestal and surrounding said shaft, a compensating member surrounding the shaft and having an annular convex portion seated in the socket member, and pins on said socket member entering openings in said compensating member and adapted to hold the latter against rotation while permitting relative lateral movement between said members.

7. In combination, a pedestal provided with a bearing, a horizontal shaft journaled in said bearing, a thrust collar on the outer end of said shaft, an annular concave socket member fixed to the outer side of said pedestal and surrounding said shaft, a compensating member surrounding the shaft and having an annular convex portion seated in the socket member, a bearing washer between the thrust collar and the compensating member, pins on the thrust collar entering openings in the washer, and pins on the socket member entering openings in the compensating member.

In testimony whereof I have hereunto signed my name in the presence of two subscribing witnesses.

ALBERT J. ELDRIDGE.

Witnesses:
M. E. McNINCH,
C. G. HEYLMUR.